(12) United States Patent
Beigang et al.

(10) Patent No.: US 9,587,681 B2
(45) Date of Patent: Mar. 7, 2017

(54) PLATE CARRIER

(71) Applicant: GKN Driveline International GmbH, Lohmar (DE)

(72) Inventors: Wolfgang Beigang, Neunkirchen-Seelscheid (DE); Waldemar Rupp, Cologne (DE); Simon Broicher, Hurth (DE); Lukas Hoets, Dusseldorf (DE)

(73) Assignee: GKN Driveline International GmbH, Lohmar (DE)

( * ) Notice: Subject to any disclaimer, the term of this patent is extended or adjusted under 35 U.S.C. 154(b) by 24 days.

(21) Appl. No.: 14/520,570

(22) Filed: Oct. 22, 2014

(65) Prior Publication Data

US 2015/0114785 A1 Apr. 30, 2015

(30) Foreign Application Priority Data

Oct. 28, 2013 (DE) ........................ 10 2013 111 877

(51) Int. Cl.
| | |
|---|---|
| *F16D 13/68* | (2006.01) |
| *F16D 13/52* | (2006.01) |
| *F16D 13/72* | (2006.01) |

(52) U.S. Cl.
CPC ........... *F16D 13/52* (2013.01); *F16D 13/683* (2013.01); *F16D 13/72* (2013.01)

(58) Field of Classification Search
CPC ................................ F16D 13/683; F16D 13/74
See application file for complete search history.

(56) References Cited

U.S. PATENT DOCUMENTS

| | | | |
|---|---|---|---|
| 7,007,783 B2 | 3/2006 | Gerathewohl et al. | |
| 8,061,497 B2 | 11/2011 | Illerhaus et al. | |
| 8,459,432 B2* | 6/2013 | Muizelaar | F16D 13/683 |
| | | | 192/113.35 |
| 2003/0234152 A1* | 12/2003 | von Levern | F16F 15/1207 |
| | | | 192/212 |
| 2004/0035667 A1 | 2/2004 | Prater | |
| 2004/0134740 A1* | 7/2004 | Gerathewohl | F16D 13/52 |
| | | | 192/70.2 |
| 2007/0193848 A1* | 8/2007 | Uhler | F16D 13/683 |
| | | | 192/112 |

(Continued)

FOREIGN PATENT DOCUMENTS

| | | |
|---|---|---|
| DE | 195 17 968 A1 | 11/1995 |
| DE | 10 2005 012 435 A1 | 11/2005 |

(Continued)

*Primary Examiner* — Jacob S Scott
*Assistant Examiner* — Lillian Nguyen
(74) *Attorney, Agent, or Firm* — Bejin Bieneman PLC (57) ABSTRACT

A plate carrier for a multi-plate clutch comprises: an annular member with a first circumferential face and a second circumferential face; a toothing in the first circumferential face of the annular member, having circumferentially distributed teeth and gaps; at least one groove in the second circumferential face of the annular member, wherein the groove extends over a circumferential portion of the annular member, wherein the groove and the toothing intersect one another, so that radial apertures are formed in the regions of intersection between the groove and the tooth gaps. A multi-plate clutch can be provided with such a plate carrier.

13 Claims, 8 Drawing Sheets

(56) References Cited

U.S. PATENT DOCUMENTS

| | | | |
|---|---|---|---|
| 2008/0142330 A1 | 6/2008 | Agner et al. | |
| 2011/0045945 A1* | 2/2011 | Buechner | F16D 13/683 475/331 |
| 2011/0203897 A1 | 8/2011 | Keating | |
| 2011/0278131 A1* | 11/2011 | Keating | F16D 13/683 192/112 |

FOREIGN PATENT DOCUMENTS

| | | | |
|---|---|---|---|
| DE | 10 2006 031 786 A1 | 1/2008 | |
| DE | 10 2007 055 151 A1 | 6/2008 | |
| DE | 102007029001 A1 * | 12/2008 | F16D 13/683 |
| DE | 10 2011 003 824 A1 | 8/2011 | |
| DE | 10 2011 102 748 A1 | 11/2012 | |
| EP | 0797016 A2 | 9/1997 | |
| EP | 1 422 430 A1 | 5/2004 | |

* cited by examiner

PLATE CARRIER

CROSS-REFERENCE TO RELATED APPLICATIONS

This application claims the benefit of priority from German Patent Application No. 10 2013 111 877.1 filed on Oct. 28, 2013, which prior application is hereby incorporated herein by reference in its entirety.

BACKGROUND

From DE 10 2011 102 748 A1, a double clutch is known for a dual clutch transmission of a motor vehicle. The double clutch comprises two clutches each having an outer plate carrier, an inner plate carrier and a plate package. In the plate carrying region, the inner plate carrier comprises a plurality of cooling fluid apertures which extend from the inner circumferential face to the outer circumferential face. The cooling fluid apertures each end between the teeth of the inner plate carrier and are arranged so as to be axially and circumferentially offset relative to the adjoining cooling fluid apertures. At the inner circumferential face there is provided a cooling fluid guiding element in the form of an annular oil guiding plate. The oil guiding plate comprises a plurality of oblong slots which are separated from one another by transverse webs. The slots are each arranged in the region of the cooling fluid aperture.

From DE 10 2007 055 151 A1, corresponding to US 2008/0142330 A1, there is known a double multi-plate clutch for the transmission of torque between a brake force generator and a multi-step transmission. The double multi-plate clutch comprises an outer multi-plate clutch and an inner multi-plate clutch. The outer plate carrier of the outer multi-plate clutch and the outer plate carrier of the inner multi-plate clutch each comprise a toothed member which is produced by roll forming. The toothed members are formed in such a way that, on the radial inside, they comprise inner teeth and, on the radial outside, they comprise outer teeth. The outer teeth each comprise apertures.

Document EP 1 422 430 A1, corresponding to U.S. Pat. No. 7,007,783 B2, also proposes a double multi-plate clutch. An outer plate carrier of the clutch is provided in the form of a pressed and punched plate component and comprises a base and a cylindrical portion. The cylindrical portion, on its radial inside, comprises circumferentially distributed alternating axial grooves and axial webs. The axial grooves are provided for the purpose of ensuring a rotationally fixed engagement of the outer plates and comprises centrally positioned apertures to allow the radial through-flow of hydraulic oil.

From DE 10 2006 031 786 A1, corresponding to U.S. Pat. No. 8,061,497 B2, a multi-plate clutch or multi-plate brake is known which comprises an inner plate carrier with inner plates and an outer plate carrier with outer plates. The inner plate carrier and, respectively, the outer plate carrier are formed of a plurality of parts and comprise a base part and a toothed part which embraces the latter and to which the plates are connected in a rotationally fixed way. The base part and the toothed part are provided with radial apertures which are fluidly connected to one another to allow a through-flow.

SUMMARY

Disclosed herein is a plate carrier for a friction plate clutch, the plate carrier for use in the driveline of a motor vehicle. Also disclosed is a friction plate clutch having such a plate carrier. The friction plate clutch is suitable for transmitting torque between a clutch input part and a clutch output part or, optionally, for interrupting a transmission of torque.

The plate carrier for a multi-plate clutch promotes good cooling of the clutch in the actuated condition, and good de-oiling in the non-actuated condition, to thereby minimize drag torque. The plate carrier comprises high static and dynamic strength values and can be produced easily and cost-effectively. Furthermore, a multi-plate clutch having such a plate carrier, while comprising high strength values, is provided with good cooling properties and low drag moments in an open condition. In addition, a simple and cost-effective process of producing such a plate carrier with said properties is disclosed.

Accordingly, a plate carrier for a multi-plate clutch may comprise: an annular member with a first circumferential face and a second circumferential face; a toothing in the first circumferential face of the annular member, having teeth and tooth gaps circumferentially distributed; at least one groove in the second circumferential face of the annular member, wherein the groove extends at least over a circumferential portion of the annular member; wherein the groove and the toothing intersect one another such that along a circumferential extension of the groove radial several apertures are formed in the annular member in regions of intersection between the groove and the tooth gaps.

An advantage is that the plate carrier ensures a good through-flow of coolant through the multi-plate clutch which can flow through the apertures distributed over the circumference. The plate carrier can be provided in the form of an outer plate carrier, with the teeth then being provided at the inner circumferential face, with the groove being arranged at an outer circumferential face; or the plate carrier can be provided in the form of an inner plate carrier, with the teeth, accordingly, being provided at an outer circumferential face and the groove being provided at the inner circumferential face. A circumferential face in this regard can be an outer face and, respectively, an inner face of the plate carrier, which respective face extends in the circumferential direction. More particularly, the first and/or the second circumferential face can be cylindrical and, to that extent, can also be referred to as cylindrical faces.

A particular advantage of the plate carrier being provided in the form of an outer plate carrier is that the cooling agent, when the clutch is open, can escape easily and quickly out of the plate package radially outwardly through the apertures. Thus, a reduction in any drag moments which are caused by relative rotational movement between the outer plates and the inner plates can be achieved.

In addition to the excellent flow characteristics of the coolant, another advantage is achieved in that the plate carrier features high static and dynamic strength values combined with easy and cost-effective production conditions. By producing a groove in the circumferential face radially opposite the toothing, a plurality of apertures can be produced in one production stage. There is no need for boring or punching out individual apertures. The coolant refers to any substance that can be used for cooling the multi-plate clutch or parts thereof, such as cooling lubricant or oil.

The groove extends in a circumferential direction along an inner or outer circumferential face of the annular member, e.g., at least along a circumferential section of the annular member which comprises several tooth gaps. The tooth gaps refer to the spaces between each two circumferentially adjacent teeth, and can thus also be referred to as tooth spaces. As already mentioned, the plate carrier can be provided in the form of an outer plate carrier according to a first possibility, in which case the second circumferential face constitutes an outer face of the annular member, with the first circumferential face constituting an inner face of the annular member, wherein a smallest radius of the groove base is smaller than a largest tooth base radius of the teeth. According to a second possibility, the plate carrier can be provided in the form of an inner plate carrier, with the second circumferential face constituting an inner face of the annular member and the first circumferential face constituting an outer face of the annular member, wherein, furthermore, a greatest radius of the groove base is greater than a smallest tooth base radius of the teeth. Unless otherwise stated, all of the below-mentioned embodiments apply to both possibilities.

More particularly, the groove, starting from the second circumferential face, comprises a groove depth, and the tooth gaps starting from the first circumferential face comprise a tooth gap depth in a cross-sectional plane axially adjoining the groove, wherein the sum of groove depth and tooth space depth is greater than the radial thickness between the first circumferential face and the second circumferential face. Thus, it is possible to achieve a geometric overlap between the groove and the teeth, thereby ensuring a reliable production of the apertures with a defined geometry. In this regard, geometric overlapping means that the toothing defines an imaginary first hollow space, and that the groove defines an imaginary second hollow space, wherein the first and second hollow spaces, in an axial view, comprise regions of intersection which form the radial apertures. The first and second hollow spaces may also be referred to as cavities.

In principle, the at least one groove can be provided in any number and in any form which can be adapted to the requirements regarding strength and through-flow capacity of the plate carrier. To achieve a high through-flow capacity, a large through-flow surface can be provided by using several grooves which, more particularly, can be distributed over the axial length of the plate carrier. If high strength values are more important, it is possible to use several grooves in one circumferential plane which are separated from one another by a reinforcing web.

For example, one or more of the following embodiments are conceivable: it is possible to provide only one groove which at least substantially extends in the circumferential direction. The groove can thus also be referred to as a circumferential groove. The expression "at least substantially in the circumferential direction" as used herein includes the possibility of the groove being positioned in a plane extending perpendicularly relative to the longitudinal axis of the plate carrier or of the groove comprising at least one portion which, relative to a perpendicular plane, comprises a gradient component in an axial direction, i.e. is shaped slightly helically. The gradient angle between the groove and a plane extending perpendicularly relative to the longitudinal direction can, more particularly, be smaller than or equal to 20°. It applies to both possibilities, i.e. a groove without or with an axial gradient, that the groove can be circumferentially finite or that it can be continuously closed, i.e., provided in the form of an annular groove. In the embodiment comprising a finite groove, it is possible that several grooves are arranged so as to be circumferentially distributed, for instance, two, three or four grooves, with a separating web being formed between each two circumferentially adjoining grooves. According to a further embodiment, a plurality of grooves can be arranged along the width (axial length) of the plate carrier which can be arranged so as to be axially spaced from one another. Each of the grooves thus forms a row of apertures in the region of intersection with the tooth gaps between the teeth. The grooves can each be positioned in a radial plane or they can circumferentially extend slightly helically with an axial gradient component relative to the longitudinal axis of the plate carrier. For good oil flow characteristics it is advantageous if each two adjoining helical grooves circumferentially overlap one another at least with partial portions. It can apply to all embodiments that the at least one groove, in a cross-sectional view, comprises rounded recesses, which reduces stresses in the component, which thus leads to a high strength value and an increase in service life.

The geometry of the apertures is largely determined by the geometry of the teeth, respectively toothing. In the circumferential direction, the radial apertures are delimited by two opposed side faces of two adjoining teeth. In the regions laterally or axially adjoining the groove, the gaps occurring between two adjoining teeth form channels through which clutch oil is able to flow axially to the respective aperture. To achieve a good flow behaviour it is advantageous if the teeth, in a base region, each comprise a substantially constant thickness. This shall also include that the tooth flanks in this base region extend between a radial plane and a parallel plane with reference to the longitudinal axis. More particularly, the tooth flanks of two opposed teeth in the base region can extend substantially parallel relative to one another.

In a cross-sectional plane through the groove, the teeth comprise a greatest tooth thickness, and the apertures between two teeth comprise a greatest width, with the ratio between tooth thickness and width amounting to at least one and/or a maximum of three. This embodiment achieves a particularly high strength value of the plate carrier. The tooth thickness and the width of the apertures each refer to the circumferential direction of the plate carrier. The expression "cross-sectional plane through the groove" refers to a section through the groove base along the circumferential extension of the groove.

Furthermore, in a cross-sectional plane through the groove, the teeth comprise a greatest tooth height, and the annular web between the second circumferential face and the tooth base lines of the toothing comprises a radial thickness, wherein the ratio between the tooth height and the radial thickness of the annular web preferably amounts to one and/or a maximum of two. This embodiment, too, advantageously contributes to a high strength value of the plate carrier.

The ratio between a greatest outer diameter of the annular member and the radial thickness of the annular web between the second circumferential face and the tooth base lines of the toothing can be subject at least to one of the following: the greatest outer diameter of the annular member corresponds to at least 35 times, or at least 55 times the radial thickness of the annular web; and/or the greatest outer diameter of the annular member corresponds to maximal 95 times, or maximal 75 times the radial thickness of the annular web. In this way, good strength properties of the plate carrier can be achieved.

The plate carrier can be configured such that in longitudinal sections through the plate carrier one or more apertures are provided, wherein the sum of all apertures existing in a longitudinal section define a cumulated length, wherein the ratio of the cumulated length of the at least one aperture to the effective axial length of the teeth is possibly at least 0.2 and/or a maximum of 0.6. Thus, a good compromise between the achievable quantity of oil through-flow and the strength of the plate carrier can be achieved. In this context, effective length refers to the length along which the plate package extends in the built-in condition and, respectively, the length along which a transmission of torque takes place. The effective length of the teeth is shorter than the total length of the plate carrier.

Furthermore, a multi-plate clutch can comprise a first plate carrier to which the first plates are connected in a rotationally fixed and axially movable way; a second plate carrier to which second plates are connected in a rotationally fixed and axially movable way; wherein the first plate carrier and the second plate carrier are rotatable relative to one another around an axis of rotation, wherein, by introducing an axial force, the first plates and the second plates are brought into friction contact with one another for selectively transmitting torque between the first plate carrier and the second plate carrier, wherein at least one of the first and second plate carriers is configured according to at least one of the above-mentioned embodiments.

The multi-plate clutch offers the same advantages of good through-flow conditions for the clutch and simultaneously high strength which have already been mentioned in connection with the presently disclosed multi-plate carrier. For reducing the drag torque of the clutch, it is advantageous if the outer one of the first and the second plate carrier—which can also be referred to as the outer plate carrier—is configured in said design with a groove. In this embodiment, the outwardly flowing cooling agent can escape from the plate packet particularly rapidly, when the clutch is open, which leads to a reduction in the drag moment.

However, also the embodiment of the inner plate carrier in said design has advantages, i.e., in respect of an effective cooling system for the plate package. Due to the large number of apertures it is possible for a relatively large quantity of cooling agent to reach the plate package from the radial inside for the purpose of cooling the plates. In addition, because of the great strength of the at least one plate carrier, the clutch is able to transmit a particularly high torque.

Furthermore, the objective of the invention is achieved by a process of producing a plate carrier for a multi-plate clutch with the following process stages: providing an annular member with a longitudinal axis and a toothing in a first circumferential face of the annular member, wherein teeth and tooth gaps of the toothing extend in the axial direction; working a groove into a second circumferential face of the annular member, which groove at least substantially extends in the circumferential direction; wherein the groove, starting from the second circumferential face, is worked sufficiently deeply into the annular member such that along a circumferential extension of the groove several radial apertures are formed in the annular member in intersecting regions between the groove and the tooth gaps.

In an advantageous way, said process allows several apertures to be produced simultaneously in one working operation. A further advantage consists in that the process, is suitable for producing plate carriers out of a solid component as a starting part. In this regard, solid components, for example, are parts which can be produced by solid forming or chip-forming machining or a powder metal process. This embodiment ensures great plate carrier strength allowing the transmission of high torque values. It is understood that any embodiment of the process is applicable to the product, and vice versa.

According to a first possibility, the processes of producing the annular member and working in the teeth are carried out in one operation in that the annular member is pressed out of powder metal and solidified in a sintering process. Subsequently, the groove can be worked into the sintered component, preferably by a chip-forming operation such as turning or milling. Producing the plate carrier by sintering ensures particularly high production accuracies of the carrier toothing, which has an advantageous effect on the carrying capacity in respect of the plate toothing of the plates to be form-fittingly received. Sintering is particularly suitable for medium-sized quantities where the tooling costs are relatively low. In the case of large quantities, the production of formed plate metal parts may also be suitable. To that extent, there exists a second possibility in that the plate carrier is produced by forming same out of a plate metal part where, initially a plate metal strip is formed into a sleeve with inner and outer teeth. The apertures are worked in subsequently, which can be done by chip-forming machining such as turning or milling.

DESCRIPTION OF THE DRAWINGS

Exemplary embodiments will be explained below with reference to the drawings wherein.

DETAILED DESCRIPTION OF THE DRAWINGS

FIGS. 1 to 7 will be described jointly below. There is shown a plate carrier 2 for a friction plate clutch in a first embodiment. A friction plate clutch generally comprises two plate carriers which are rotatable relative to one another around an axis of rotation, i.e. an outer plate carrier in which outer plates are received in a rotationally fixed and axially movable way, and an inner plate carrier at which inner plates are held in a rotationally fixed and axially movable way. The outer plates and the inner plates are arranged so as to alternate axially relative to one another and jointly form a plate package. A friction plate clutch can also be referred to as multi plate clutch or multi disc clutch.

The plate carrier 2 shown in FIGS. 1 to 7 is provided in the form of an outer plate carrier which comprises a hub portion 3 with hub teeth 4 which can be made to engage a driveshaft (not illustrated) with corresponding shaft teeth for transmitting torque. Furthermore, the plate carrier 2 comprises a flange portion 5 which extends radially outwardly from the hub portion 3, as well as an annular portion 6 which is connected to the flange portion 5 and which is arranged coaxially to the hub portion 3. The annular portion 6 extends in axial direction and may also be referred to as annular member, casing portion or cylindrical portion.

The annular member 6 comprises a first circumferential face 7 which forms an inner circumferential face of the annular member 6, as well as a second circumferential face 8 which forms an outer circumferential face.

Figure 1:
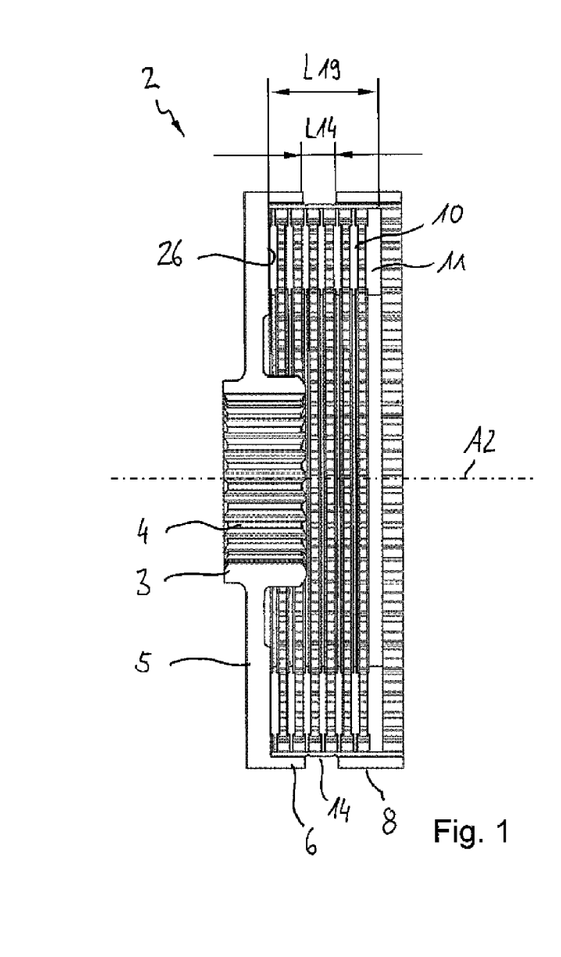
FIG. 1 shows an exemplary plate carrier in a first embodiment in a longitudinal section, in the form of an outer plate carrier.
Figure 2:
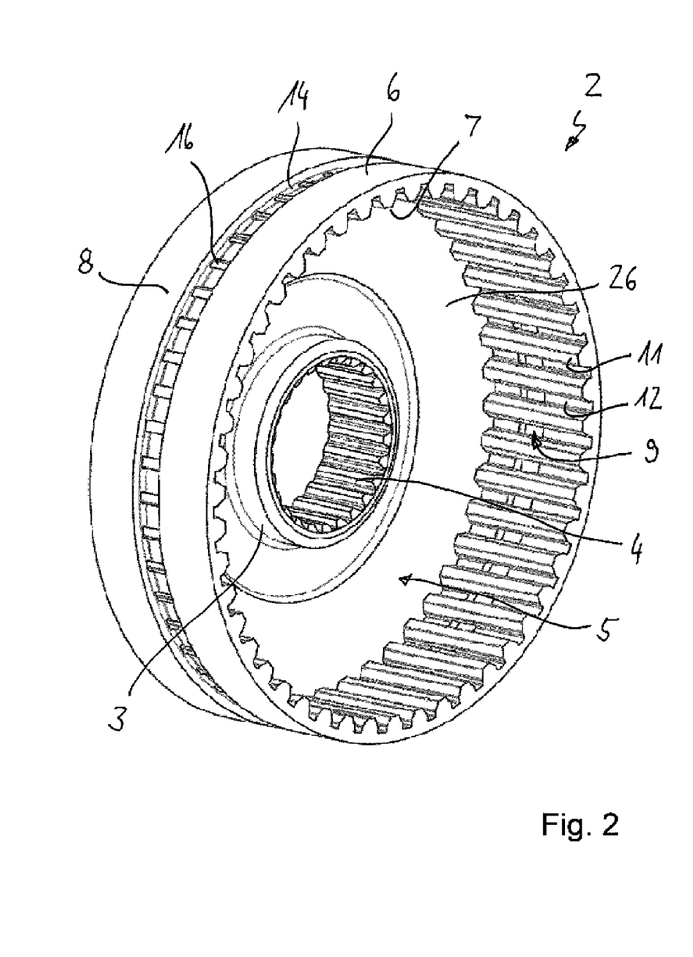
FIG. 2 shows the plate carrier according to FIG. 1 in a three-dimensional view.
Figure 3:
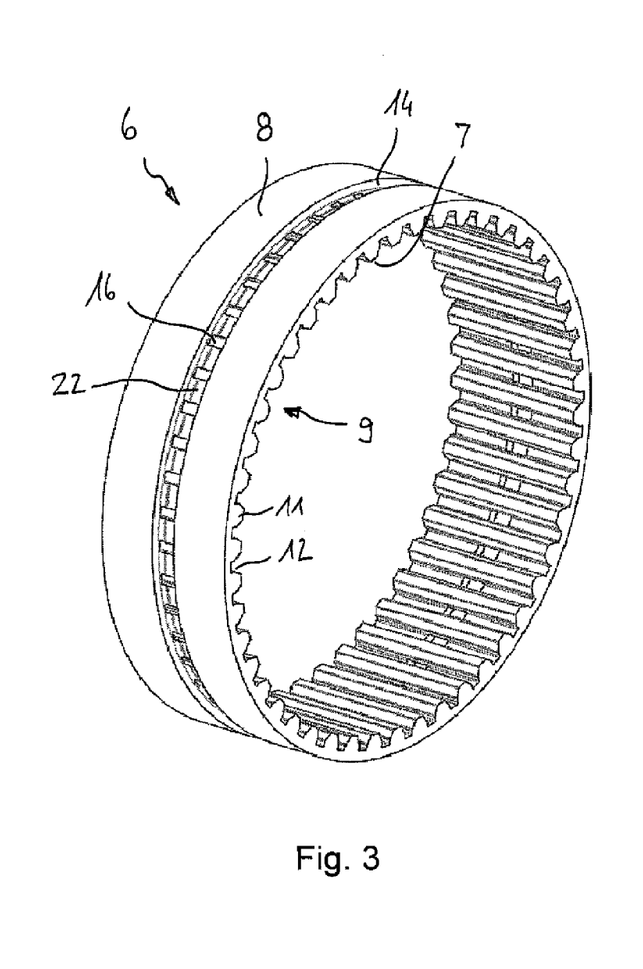
FIG. 3 shows the annular portion of the plate carrier according to FIGS. 1 and 2 in a three-dimensional view.
Figure 4:
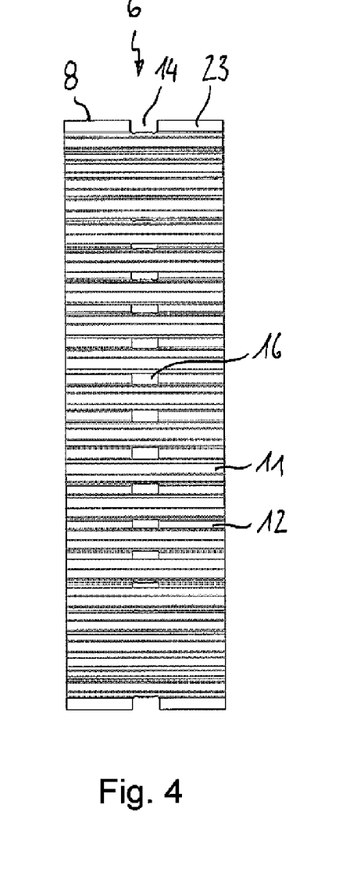
FIG. 4 is a longitudinal section through the annular portion according to FIG. 3.
Figure 5:
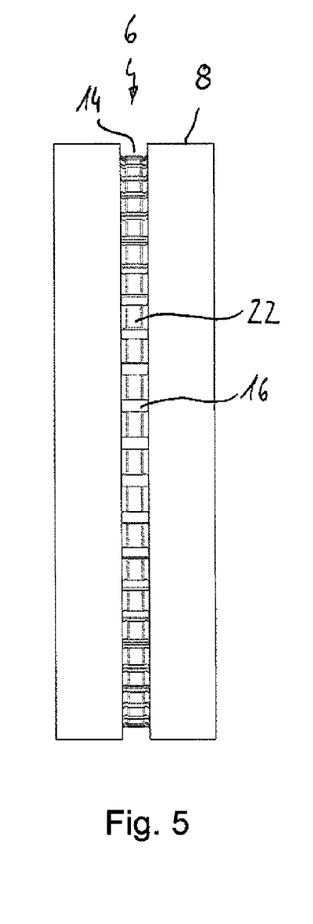
FIG. 5 is a radial view of the annular portion according to FIG. 3.

Radially in an interior, the annular member 6 comprises a toothing 9 in the form of an inner toothing which is engaged in a rotationally fixed and axially movable way by a corresponding outer toothing of outer plates 10 for transmitting torque. The outer plates 10 are shown in FIG. 1. It can be seen that the plates 10 are arranged so as to be axially spaced from one another. These gaps are engaged by inner plates (not shown) of an inner plate carrier of the friction clutch. The outer plate carrier 10 and the inner plate carrier jointly form the plate package. The plate package is axially supported against a supporting face 26 of the flange portion 5 and can be loaded with an axial force by a pressure plate 11, so that a friction contact between the outer plates 10 and the inner plates is achieved, with torque being transmitted between the outer place carrier 2 and the inner plate carrier. The pressure plate 11 can be loaded by an actuator shown) which can be provided for example, in the form of an electro-magnetic, electro-mechanical or hydraulic actuator.

The toothing 9 comprises circumferentially alternating teeth 11 and tooth gaps 12 which extend in the axial direction. In the present embodiment, the teeth 11 extend parallel to the longitudinal axis A, i.e., the toothing 9 comprises straight teeth. However, it is understood that the teeth can also be slightly inclined, i.e., provided in the form of helical teeth. The teeth 11 comprise a tooth head line 13 which can also be referred to as addendum line, addendum circle or tip circle. The radially inner face which defines the tip circle forms the inner first circumferential face 8 of the annular member 6.

A groove 14 is provided in the second circumferential face 7, respectively worked into said second face. The groove 14 extends in the circumferential direction. In the present embodiment, the groove 14 is continuously closed and, in that respect, can also be referred to as an annular groove. The annular groove 14 extends in a plane which extends perpendicularly relative to the longitudinal axis A and divides the outer circumferential face 7 into two axially spaced surface portions. With reference to the axial length of the plate package, the annular groove 14 is arranged approximately centrally, which is particularly obvious in FIG. 1. The groove 14 extends from the outer circumferential face 7 radially inwardly as far as and beyond a tooth baseline 15 of the toothing 9, so that in the region of the circumferential extension of the groove 14, between each two teeth 11, there are formed radial apertures 16. The tooth baseline 15 can also be referred to as root line, root circle or addendum circle.

Figure 6:
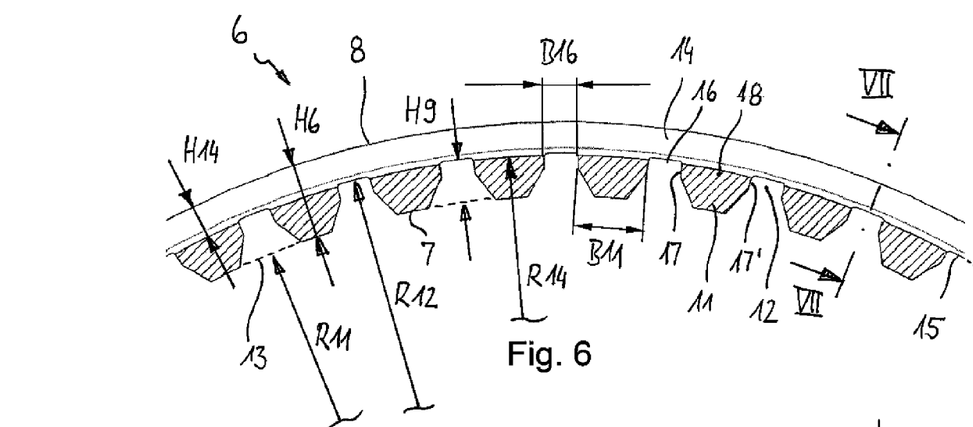
FIG. 6 shows a detail of the annular portion according to FIG. 3 in an axial view.

It can be seen in FIG. 6, which shows part of the annular member 6 in an axial view in the form of an enlarged detail, that, starting from the inner circumferential face 7, the tooth gaps 12 comprise a gap depth H9 which corresponds to the tooth height. The gap height H9 extends between a tooth tip radius R11 and a tooth base radius R12. Furthermore, starting from the outer circumferential face 8, the groove 14 comprises a groove depth H14. Furthermore, between the inner circumferential face 7 and the outer circumferential face 8, the annular member 6 comprises a radial extension H6 which can also be referred to as thickness. It can be seen that the sum of groove depth H14 and gap depth H9 is greater than the radial extension H6 of the annular member 6. By this embodiment, a geometric overlap between the groove 6 and the toothing 9 is achieved, so that the apertures 16 are formed with a defined geometry. The geometry of the apertures 16 is substantially formed by the geometry of the toothing 9. The plate carrier 2 is provided in the form of an outer plate carrier, wherein the first circumferential face 7 constitutes an inner face of the annular member 6 and the second circumferential face 8 constitutes an outer face of the annular member 6. A smallest radius R14 of the groove base 22 is smaller than a largest tooth base radius R12 of the teeth 9.

In the circumferential direction, the apertures 16 are delimited by two opposed side faces 17, 17' of two adjoining teeth 11. The teeth 11 each comprise a base region 18 with a substantially constant width B11 along the height. The expression "substantially constant" is intended to comprise certain angular deviations of the tooth flanks 17, 17' in the base region 18 of up to five degrees. Accordingly, the tooth flanks 17, 17' circumferentially delimiting a tooth gap 16 extend substantially parallel relative to one another, so that a uniform width B16 of the apertures 16 results along the radial extension of the base region 18. This embodiment ensures that the apertures 16, in their radial direction, comprise an at least substantially constant cross-sectional face which is relatively large, thus achieving a good flow behaviour of the coolant from the inside of the outer plate carrier 2 towards the radial outside.

The ratio between the tooth thickness B11 in the base region and the width B16 of the apertures 16 preferably ranges between one and three, with the limits being included. This embodiment achieves a particularly high strength of the plate carrier 2. However, it is understood that other ratios are conceivable. The ratio between the tooth height H9 and the radial thickness H23 of the annular web 23, which is formed between the second circumferential face 8 and the tooth base line 15, preferably ranges between one and two, but deviating ratios are also generally conceivable.

Figure 7:
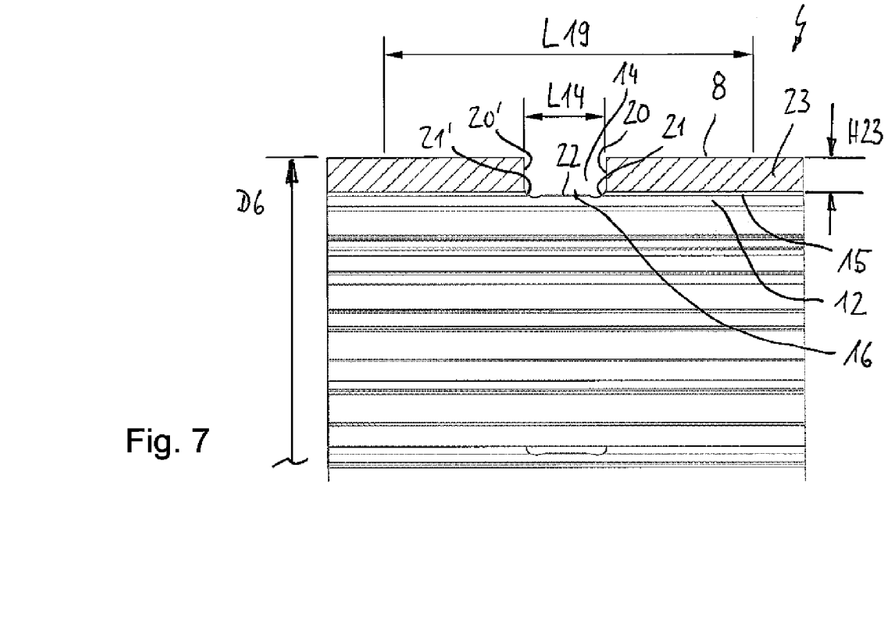
FIG. 7 shows a detail of the annular portion according to FIG. 3 in a longitudinal section along sectional line VII-VII of FIG. 6.

Further geometric details are shown in FIG. 7. The annular member 6 comprises a greatest outer diameter D6. The annular groove 14 comprises an axial length L14. Furthermore, the toothing 9 defines an effective portion with a length L19, which portion, in the mounted condition, is positioned in the region of transition with the plate package. The ratio between the length L14 of the groove 14 and the effective axial length L19 of the toothing 9 can range between 0.2 and 0.6. This embodiment ensures a good compromise between the achievable quantity of through-flowing coolant and the strength of the plate carrier 2, but in principle other radios are also conceivable.

The ratio between the greatest outer diameter D6 of the annular member 6 and the radial thickness H6 of the annular web preferably ranges between 35 and 95, e.g., between 55 and 75. This embodiment, too, achieves good strength properties of the plate carrier 2.

Furthermore, it can be seen in FIG. 7 that the groove 14, if viewed in a longitudinal section through the plate carrier 2, comprises parallel side walls 20, 20', as well as rounded transition regions 21, 21' towards the base 22 of the groove. The laterally axially adjoining annular webs 23 of the annular member 6 each comprise a wall thickness H23 which is smaller than the depth H14 of the groove. The annular webs 23 can also be referred to as annular regions.

A process of producing the plate carrier 2 can comprise the following process stages:

Producing an annular member 6 with a longitudinal axis A, a first circumferential face 7 with a toothing 9, and a second circumferential face 8, as well as working in the groove 14 into the second circumferential face 8 of the annular member 6, wherein the groove 14, starting from the second circumferential face 8, is worked into the annular member 6 down to such a depth that radial apertures 16 are formed in the regions of intersection with the tooth gaps 12. The annular member 6 can be pressed out of powder metal and subsequently solidified in a sintering process. The groove 14 is subsequently worked into the sintered component, preferably by a chip-forming process, such as turning or milling. Alternatively, the groove can also be worked into the blank prior to the sintering process.

In the present embodiment the plate carrier 2 is provided in the form of an outer plate carrier, i.e., the toothing 9 is provided in an inner circumferential face 8, whereas the groove 14 is provided in an outer circumferential face 7. For producing an inner plate carrier, the teeth would have to be on the outside and the groove on the inside. An advantage of said process is that one single production stage, i.e., working in the groove 14, is sufficient for working several apertures 16 simultaneously into the annular member 6. The process is thus particularly efficient.

Figure 8:
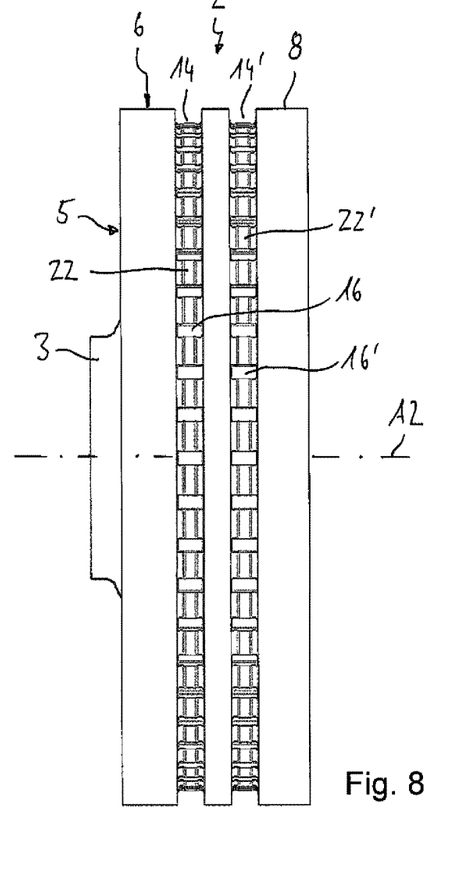
FIG. 8 shows an exemplary plate carrier in a second embodiment in a radial view, in the form of an outer plate carrier.

FIG. 8 shows a plate carrier 1 in a second embodiment which largely corresponds to the embodiment according to FIGS. 1 to 7, so that as far as common features are concerned, reference is made to the above description, with identical details or details corresponding to one another having been given the same reference numbers as in FIGS. 1 to 7.

A special feature of the embodiment according to FIG. 8 is that there are provided two grooves 14, 14' which are arranged in planes extending radially relative to the axis of rotation A2 and are axially spaced relative to one another. Both grooves 14, 14' are continuously closed (annular grooves). By using two grooves 14, 14', the through-flow area which is defined by the sum of all apertures 16, 16' is increased. Overall, there is thus achieved an increased through-flow capacity for the coolant from the inside of the outer plate carrier 2 to the radial outside. When the clutch is opened, the coolant can quickly escape through the apertures 16,16' into the outside, which leads to a definite reduction in the drag moment of the clutch.

In the present embodiment, the above-mentioned ratio between the length L16 of the apertures 16 and the effective axial length L19 of the toothing 9 refers to the cumulated length of the apertures 16, 16' in a longitudinal section through the plate carrier 2. This means for the present embodiment that the length of the apertures is composed of the length L16 and the length L16' ($L16_{tot}$=L16+L16'). It can be seen that the width of the grooves L14, L14', which define the length of the apertures 16, 16', is of a same magnitude.

Figure 9:
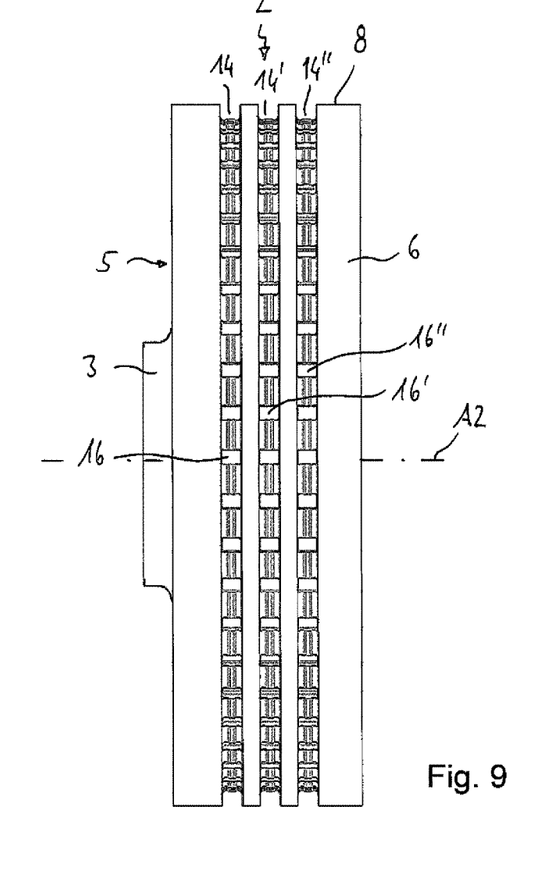
FIG. 9 shows an exemplary plate carrier in a third embodiment in a radial view, in the form of an outer plate carrier.

FIG. 9 shows a further embodiment of a plate carrier 2, which largely corresponds to the embodiment according to FIG. 8, so that as far as common features are concerned, reference is made to the above description, with identical details or details corresponding to one another having been given the same reference numbers as in FIG. 8.

A special feature of the embodiment according to FIG. 9 consists in that there are provided three grooves 14, 14', 14" which are arranged in planes extending radially relative to the axis of rotation A2 and which are axially spaced from one another. The three grooves 14, 14', 14" are provided in the form of radially closed grooves (annular grooves). By using three grooves 14, 14', 14" the cumulated through-flow area can be even further increased. When the clutch is open, the drag moment of the clutch can be thus reduced even further. The cumulative length L16tot of the apertures 16, 16', 16" in this case amounts to three times a length L16 ($L16_{tot}$=L16+L16'+L16").

Figure 10:
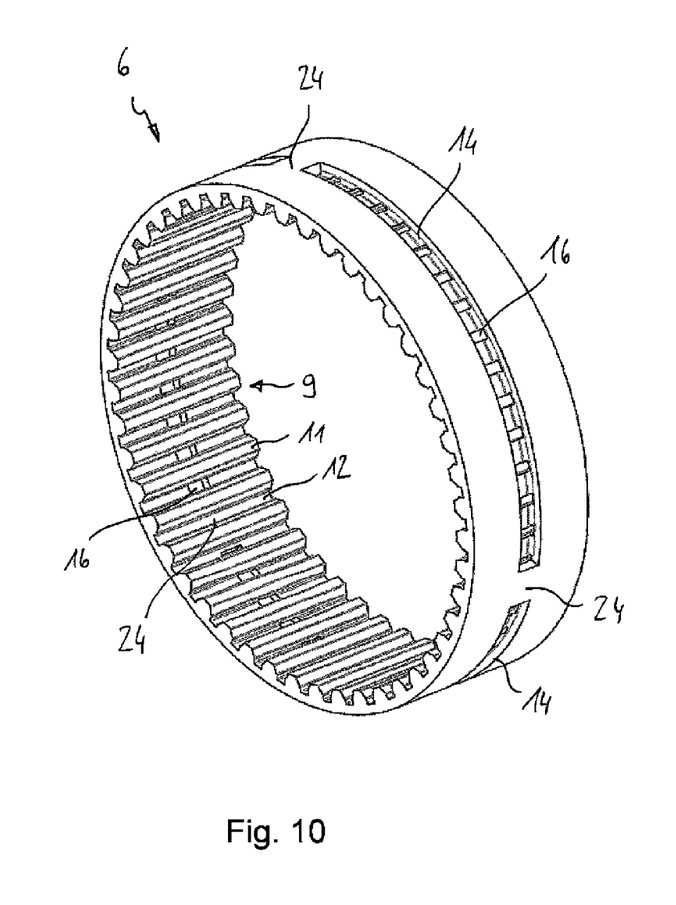
FIG. 10 shows an annular portion of an exemplary plate carrier in a fourth embodiment in a three-dimensional view, in the form of an outer plate carrier.
Figure 11:
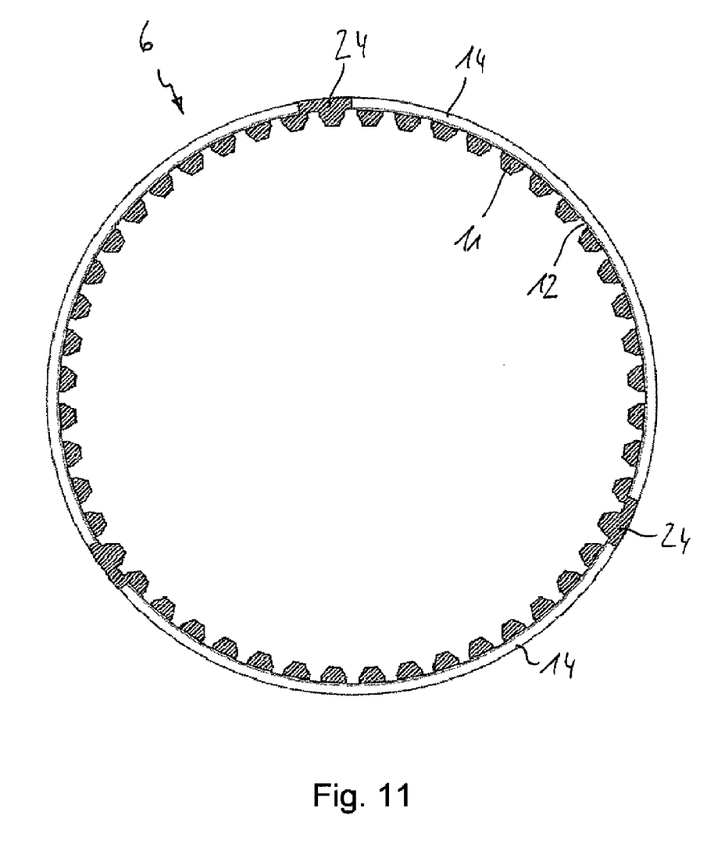
FIG. 11 is an axial view of the annular portion according to FIG. 10.

FIGS. 10 and 11 show an annular member 6 for a plate carrier 2 in a further embodiment which largely corresponds to the annular member 6 of the embodiment according to FIGS. 1 to 7, so that as far as common features are concerned, reference is made to the above description, with identical details or details corresponding to one another having been given the same reference numbers as in FIGS. 1 to 7.

A special feature of the present embodiment consists in that several grooves 14 are arranged around the circumference, which are positioned in a common radial plane. A respective web 24 is formed between each two circumferentially adjoining grooves 14. The webs 24 extend in the circumferential direction at least around the circumferential region of a tooth gap 12, and it is also conceivable to propose a larger circumferential extension which can comprise two or more tooth gaps. An advantage of the present embodiment with a plurality of circumferentially arranged grooves 14 with webs 24 located therebetween refers to a greater strength of the annular member 6 and of the plate carrier 2, respectively, and thus a higher torque capacity for the multi-plate clutch. In the present embodiment, there are provided three grooves 14 with separating webs 24 therebetween, but it is understood that also a different number of two, four or more separating webs 24 can be provided.

Figure 12:
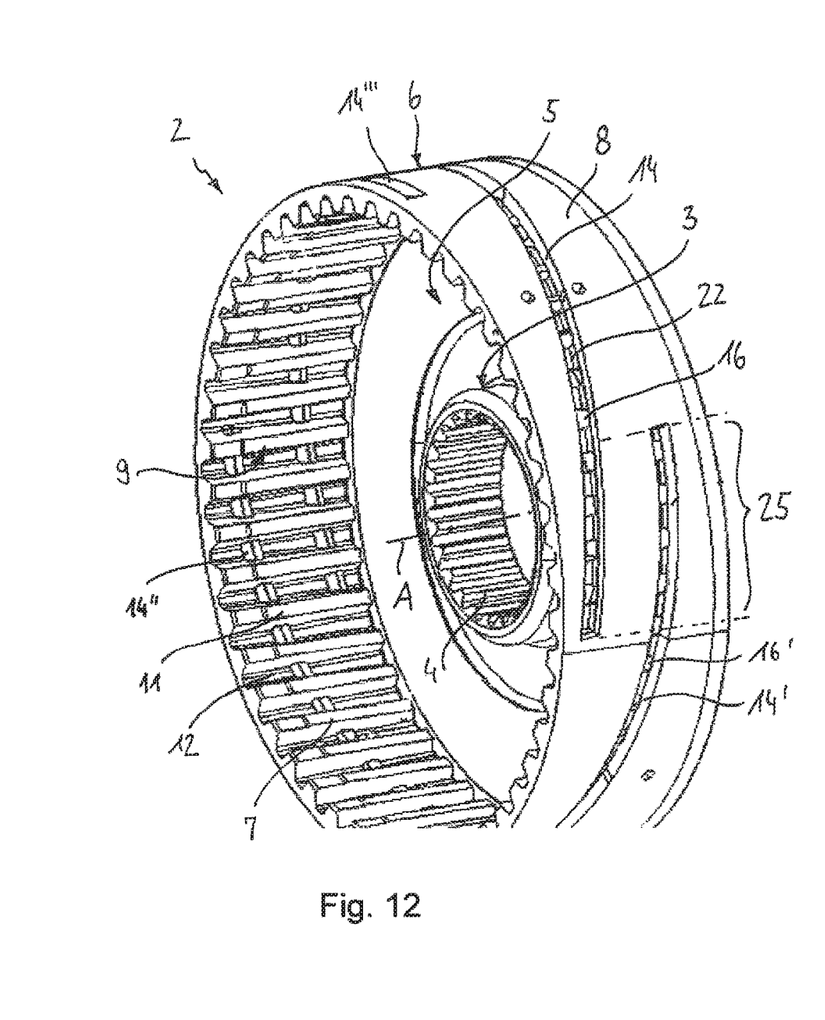
FIG. 12 shows an exemplary plate carrier in a further embodiment in a three-dimensional view, in the form of an outer plate carrier.

FIG. 12 shows a plate carrier 2 in a further embodiment which largely corresponds to the embodiment according to FIGS. 1 to 7, so that as far as common features are concerned, reference is made to the above description, with identical details or details corresponding to one another having been given the same reference numbers as in FIGS. 1 to 7.

In the embodiment according to FIG. 12 there are also provided several grooves 14, 14', 14", 14'" (hereafter given the same reference number 14 for simplicity). The grooves 14 have a main direction of extension in the circumferential direction and comprise a smaller axial gradient component. A gradient angle is enclosed between the grooves 14 and a radial plane extending perpendicularly relative to the longitudinal axis A, which gradient angle can amount to 0° to 10°.

Overall, this embodiment provides a helical shape of the grooves 14. The grooves 14 are arranged such that each two adjoining grooves comprise a region of overlap 25 in the circumferential direction. Overall, with this embodiment, too, there is ensured a larger total area of the apertures 16 and thus a higher through-flow capacity for the coolant from the inner plate carrier 2 towards the outside.

In the present embodiment according to FIG. 12, four helical grooves 14 are distributed around the circumference, but it is to be understood that a different number of two, three or more grooves 14 can also be used. In principle, because the grooves extend in the axial and circumferential direction, this embodiment represents a combination of the embodiment according to FIG. 8 comprising several grooves distributed in axial direction and the embodiment according to FIGS. 10 and 11 comprising several circumferentially distributed grooves.

Figure 13:
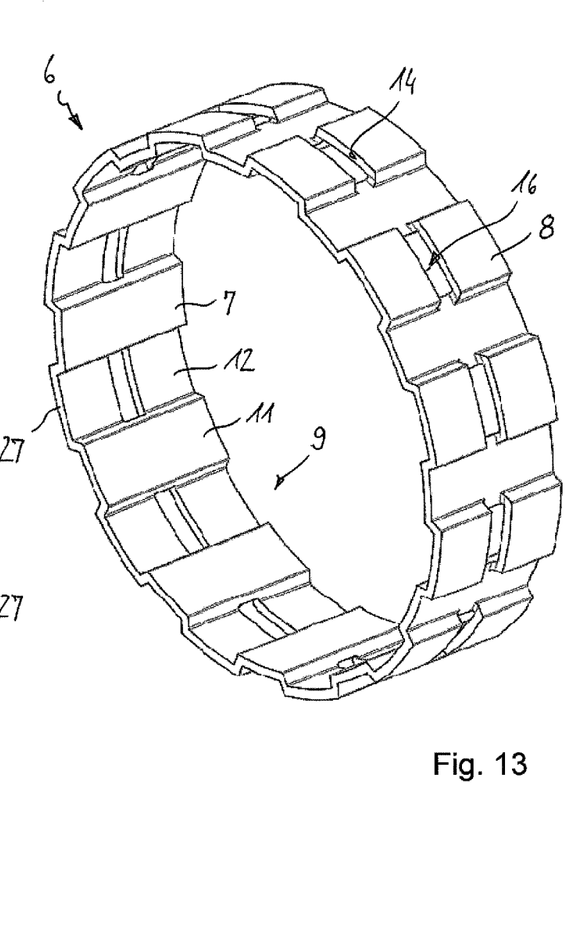
FIG. 13 shows the annular portion of an exemplary plate carrier in a further embodiment in a three-dimensional view.
Figure 14:
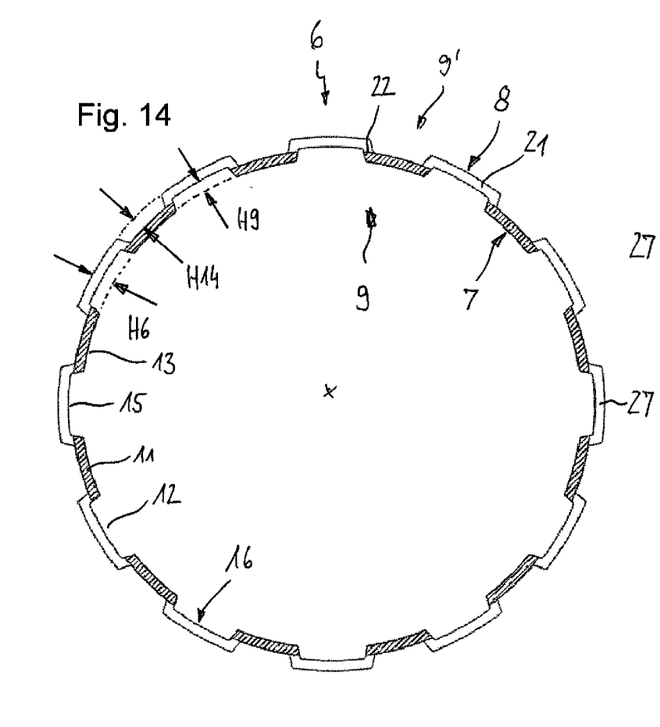
FIG. 14 shows the annular portion according to FIG. 13 in a cross-sectional view through the groove.

FIGS. 13 and 14 show an annular member 6 for a plate carrier 2 in a further embodiment which largely corresponds to the embodiment according to FIGS. 1 to 7, so that as far as common features are concerned, reference is made to the above description, with identical details or details corresponding to one another having been given the same reference numbers as in FIGS. 1 to 7.

A special feature of the present embodiment according to FIGS. 13 and 14 is that the annular member 6 is produced for example as a sheet metal part or metal formed part. For this purpose, a sheet metal ring is first produced having a uniform wall thickness into which ring the toothing 9 is worked by means of a forming operation. Because it is a sheet metal component, the inner toothing 9 simultaneously forms an outer toothing 9'. The inner toothing 9 comprises teeth 11 and tooth gaps 12, which alternate along the circumference. The teeth 11 and tooth gaps 12 are provided in the form of a cylindrical portions, with the inner face of the teeth 11 forming the inner circumferential face 7 and the outer face of the arches 27 form the outer circumferential face 8. The circumferential extension of the teeth 11 approximately corresponds to the circumferential extension of the gaps 12 formed between two teeth. Subsequently, die groove 14 is worked into the annular member 6 comprising the formed-in toothing 9, which operation can take place by making use of a chip-forming process such as turning or milling. In the present embodiment, too, the depth H14 of the groove 14 is worked in down to a depth where there are produced apertures 16 towards the tooth gaps 12. This is achieved in that the sum of the groove depth H14 and the tooth height H9 is greater than the radial extension H6 between the inner circumferential face 7 and the outer circumferential face 8. Alternatively, it is also conceivable to produce the toothing geometry according to FIGS. 13 and 14 by a powder metal process.

An advantage of the present embodiment consists in that, due to an optimised geometry and the improved production process, it comprises a small wall thickness and thus a lower weight. The present embodiment can also be used as an inner plate carrier, optionally with the geometric dimensions being adapted to the technical requirements. In that case, the inner plates would engage the outer toothing 9' for transmitting torque.

Figure 15:
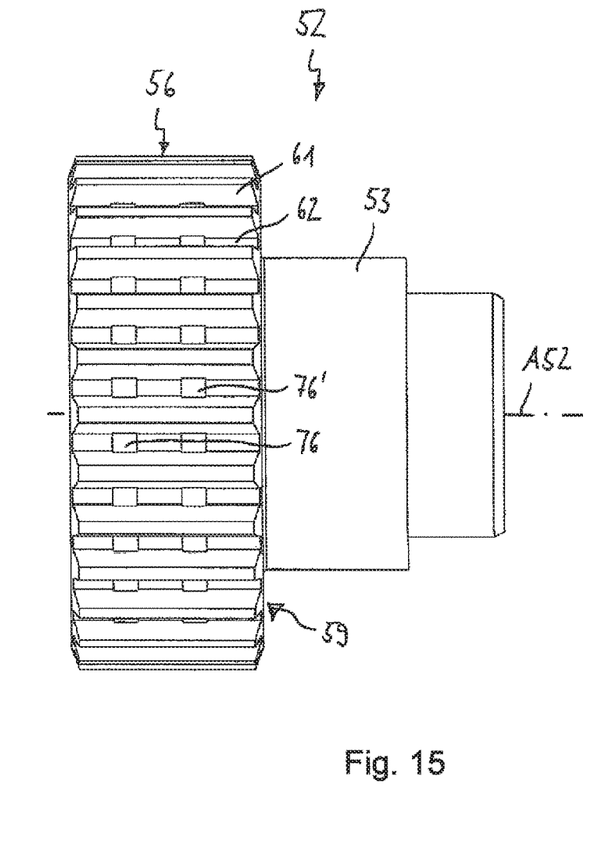
FIG. 15 shows an exemplary plate carrier in a further embodiment in a radial view, in the form of an inner plate carrier.
Figure 16:
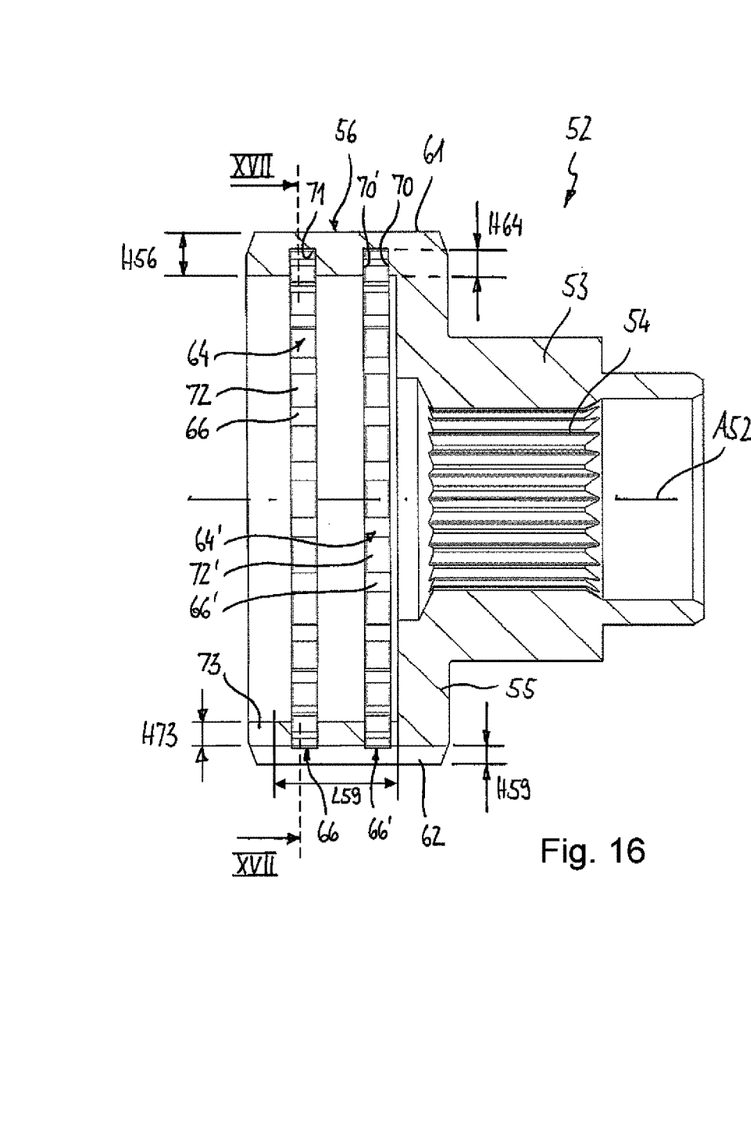
FIG. 16 is a longitudinal section through the plate carrier according to FIG. 15.
Figure 17:
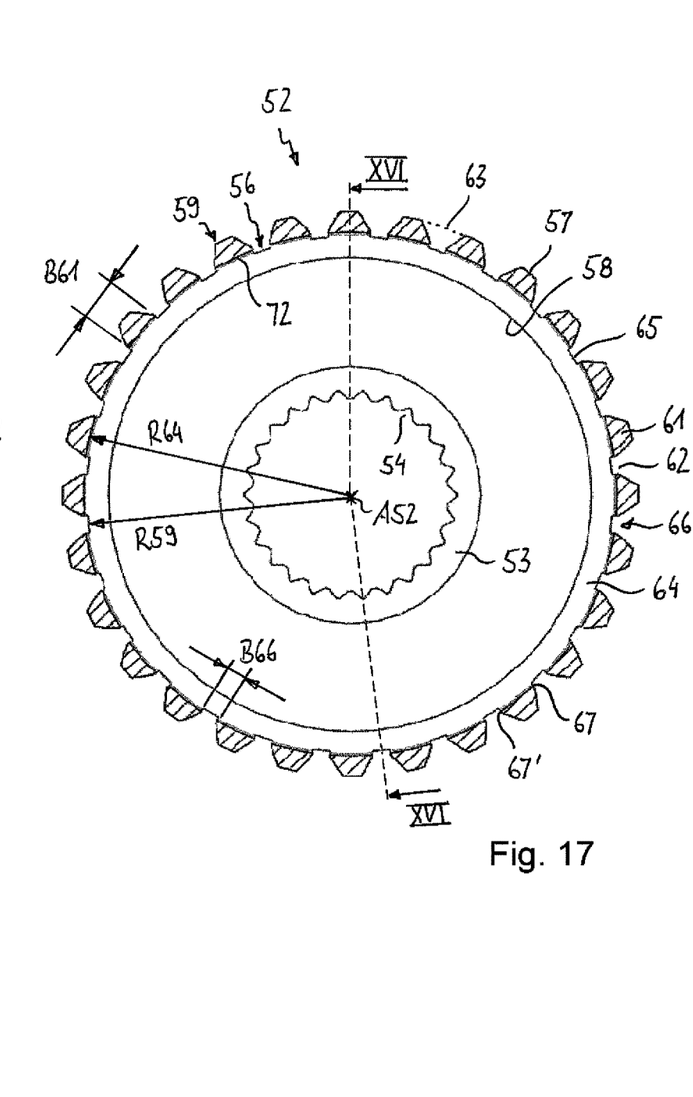
FIG. 17 shows the plate carrier of FIG. 15 in a cross-sectional view along sectional line XVII-XVII of FIG. 16.

FIGS. 15 to 17 which will be described jointly below show a plate carrier 52 in a further embodiment which largely corresponds to the embodiment according to FIGS. 1 to 7 to the description of which reference is hereby made, with identical components or components corresponding to one another having been provided with reference numbers increased by the FIG. 50.

The plate carrier 52 according to the present embodiment is provided in the form of an inner plate carrier and comprises a hub portion 53 with hub teeth 54 which, for torque transmitting purposes, can be form-fittingly engaged by a driveshaft (not illustrated). The hub portion 53 is adjoined by a flange portion 55 from which there extends the annular potion 56 in the axial direction. The annular portion 56 which can also be referred to as the annular member comprises a first circumferential face 57 which is provided in the form of an outer face, and a second circumferential face 58 which is provided in the form of an inner face. As the present embodiment constitutes an inner plate carrier, the toothing 59 is formed in the outer circumferential face 57, whereas the groove 64 is provided in the inner circumferential face 58. It can be seen in FIGS. 15 and 16 that two grooves 64, 64' extend parallel relative to one another in planes extending radially relative to the axis of rotation A52.

The toothing 59 provided in the form of outer teeth, can be engaged in a rotationally fixed and axially movable way by inner plates (not illustrated) having corresponding inner teeth, for torque transmitting purposes. The toothing 59 comprises circumferentially alternating teeth 61 and tooth gaps 62 which extend in an axial direction. The toothing 59 is provided in the form of a straight or spur toothing. The teeth 61 comprise a tooth head line 63, which forms the outer first circumferential face 57, and a tooth base line 65. A greatest radius R64 of the groove base 72 is greater than a smallest tooth base radius R59 of the teeth 61.

Two grooves 64, 64' which are arranged parallel relative to one another and which extend in the circumferential direction are worked into the inner second circumferential face 57. The grooves 64, 64' are continuously closed and can therefore also be referred to as annular grooves. The annular grooves extend in planes which extend perpendicularly relative to the longitudinal axis A5. The grooves 64, 64' extend from the inner circumferential face 58 radially outwardly as far as and beyond the tooth base line 65 of the toothing 59, so that—in the region of the circumferential extension of the grooves 64, 64'—radial apertures 66, 66' are formed between each two teeth 61.

Starting from the inner circumferential face 58, the grooves 64, 64' comprise a groove depth H64. Starting from the outer circumferential face 57, the tooth gaps 52 comprise a gap depth H59 which corresponds to the tooth height. Furthermore, between the outer circumferential face 57 and the inner circumferential face 58, the annular member 56 comprises a radial extension H56 which can also be referred to as thickness. It also applies to the present embodiment that the sum of groove depth H64 and the gap depth H9 is greater than the radial extension H56 of the annular member 56. Thus, it is possible to achieve a geometric overlap between the grooves 64, 64' and the toothing 59, so that the apertures 66, 66' are formed with a defined geometry.

Apart from that, the plate carrier 52 substantially corresponds to the above embodiments to the description of which reference is hereby made. It is understood that, more particularly, in respect of the number and design of the grooves 64, 64', modifications of the plate carrier 52 provided in the form of inner plate carrier are conceivable, as shown in FIGS. 1 to 14. More particularly, it is possible to use only one groove, or a plurality of grooves in a radial plane, or one or several helical grooves.

A multi-plate clutch can be composed of an outer plate carrier 2 according to FIGS. 1 to 7 and an inner plate carrier 52 according to FIGS. 15 to 17. However, it is understood that the outer plate carrier according to FIGS. 1 to 7 could also be combined with a different inner plate carrier, also with an inner plate carrier without apertures or with other types of apertures. Accordingly, it is understood that the inner plate carrier could be combined with a different outer plate carrier.

Overall, a multi-plate clutch with an outer plate carrier according to the embodiment according to FIGS. 1 to 14 and/or an inner plate carrier according to FIGS. 15 to 17 offer/offers an advantage of having good coolant through-flow conditions combined with a high strength value. For reducing the drag moment of the clutch it is particularly advantageous if the outer plate carrier is designed in accordance with the disclosed embodiment, which means that with an open clutch, the coolant can escape particularly quickly from the plate package, which, in turn, leads to a reduction in friction losses.

The invention claimed is:

1. A plate carrier for a multi-plate clutch with a plate package, comprising:
   an annular member with a first circumferential face and a second circumferential face;
   a toothing in the first circumferential face of the annular member, said toothing comprising teeth and tooth gaps that are circumferentially distributed;
   at least one groove in the second circumferential face of the annular member, wherein the groove extends in a circumferential direction of the annular member and is continuously closed, wherein the groove is arranged within an effective axial length of the toothing along which length the plate package extends;
   wherein the groove and the toothing intersect one another such that, along a circumferential extension of the groove, a plurality of radial apertures are formed in the annular member in regions of intersection between the groove and at least some of the tooth gaps of the toothing.

2. The plate carrier of claim 1, wherein:
   starting from the second circumferential face, the groove comprises a groove depth;
   starting from the first circumferential face, the tooth gaps comprise a tooth gap depth in a cross-section axially adjacent to the groove; and
   a sum of the groove depth and the tooth gap depth is greater than a radial thickness between the first circumferential face and the second circumferential face.

3. The plate carrier of claim 1, wherein:
   in a cross-sectional plane along the groove, one of the teeth of the toothing comprises a greatest tooth thickness;
   the radial apertures between two teeth comprise a greatest width; and
   a tooth thickness of a tooth corresponds to at least one of the width of a radial aperture and a maximum of three times the width of the radial aperture.

4. The plate carrier of claim 1, wherein:
   the annular member comprises an annular web formed between the second circumferential face and a tooth root line of the toothing, which annular web comprises a radial thickness;
   in a cross-sectional plane through said annular web, the teeth of the toothing comprise a greatest tooth height; and
   a greatest tooth height corresponds to at least one of the radial thickness of the annular web at least and double the radial thickness of the annular web at most.

5. The plate carrier of claim 1, wherein
   the annular member comprises a greatest outer diameter and an annular web formed between the second circumferential face and a tooth root line of the toothing, wherein the annular web comprises a radial thickness; and
   the greatest outer diameter of the annular member corresponds to at least one of 35 times the radial thickness of the annular web and a maximum of 95 times the radial thickness of the annular web.

6. The plate carrier of claim 1, wherein:
   in a longitudinal sectional plane through the plate carrier, there is provided at least one aperture;
   a sum of the at least one aperture existing in the longitudinal sectional plane defines a cumulated length; and
   the cumulated length of the at least one aperture amounts to at least one of 0.2 times the effective axial length of the toothing and a maximum of 0.6 times the effective axial length of the toothing.

7. The plate carrier of claim 6, wherein the radial apertures are each laterally delimited by two circumferentially opposed side faces of two adjoining teeth, and further wherein the two opposed side faces extend at least substantially parallel relative to one another.

8. The plate carrier of claim 1, wherein the first circumferential face constitutes an inner face of the annular member and the second circumferential face constitutes an outer face of the annular member, and further wherein a smallest radius of a groove base of the at least one groove is smaller than a tooth root radius of the toothing.

9. The plate carrier of claim 1, wherein the at least one groove comprises rounded recesses in a cross-sectional view through the at least one groove.

10. The plate carrier of claim 1, wherein the first circumferential face constitutes an outer face of the annular member and the second circumferential face constitutes an inner face of the annular member, and further wherein a greatest radius of a groove base of the at least one groove is greater than a tooth root radius of the Loathing.

11. The plate carrier of claim 10, wherein a plurality of grooves is provided which are axially spaced relative to one another, and further wherein each of the plurality of grooves forms a row of apertures in a region of overlap with the tooth gaps.

12. A method of producing a plate carrier for a multi-plate clutch, comprising:
   providing an annular member with a longitudinal axis and a toothing in a first circumferential face of the annular member, wherein teeth and tooth gaps of the toothing extend in an axial direction;
   working a groove into a second circumferential face of the annular member, which groove extends in a circumferential direction and is continuously closed and is arranged within an effective axial length of the toothing along which length a plate package of the multi-plate clutch extends;
   wherein the groove, starting from the second circumferential face, is worked sufficiently deeply into the annular member such that, along a circumferential extension of the groove, several radial apertures are formed in the annular member between the groove and the tooth gaps.

13. The method according to claim 12, wherein providing the annular member with the toothing is carried out in one operation in that the annular member is pressed out of powder metal and solidified in a sintering operation, and further wherein, in a subsequent step, the groove is worked into the sintered component.

* * * * *

UNITED STATES PATENT AND TRADEMARK OFFICE
CERTIFICATE OF CORRECTION

PATENT NO. : 9,587,681 B2
APPLICATION NO. : 14/520570
DATED : March 7, 2017
INVENTOR(S) : Wolfgang Beigang et al.

Page 1 of 1

It is certified that error appears in the above-identified patent and that said Letters Patent is hereby corrected as shown below:

In the Claims

Column 14, in Line 36, replace "radius of the Loathing." with -- radius of the toothing. --.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*